United States Patent Office 3,262,266
Patented July 26, 1966

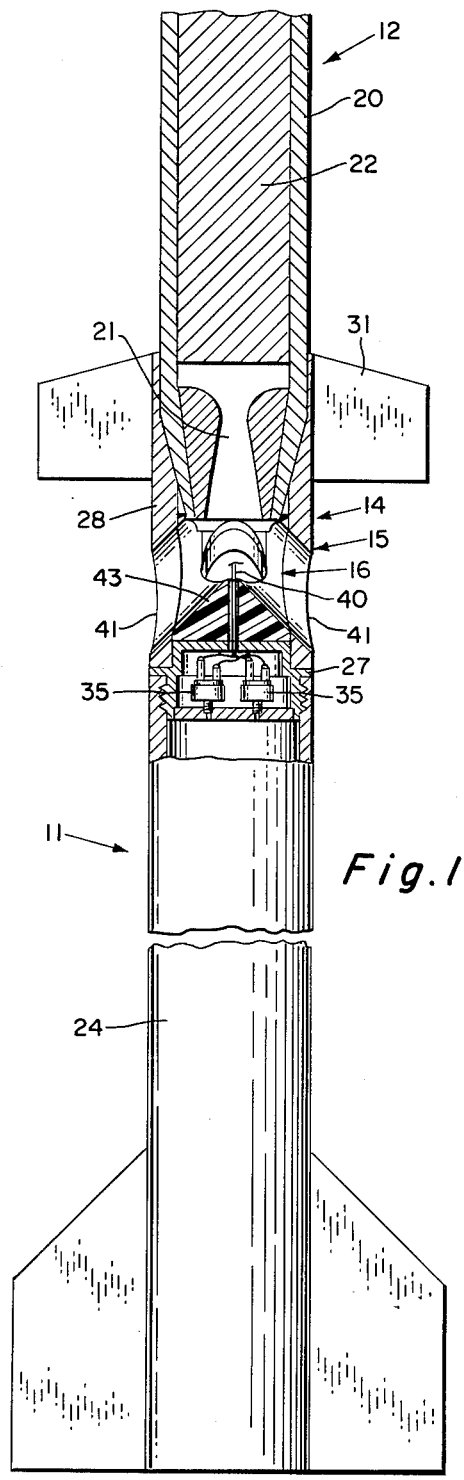

3,262,266
ROCKET INTERSTAGE ADAPTER
James F. Howison, Huntsville, Ala., assignor to the United States of America as represented by the Secretary of the Navy
Filed Aug. 31, 1964, Ser. No. 393,452
7 Claims. (Cl. 60—35.6)

The invention described herein may be manufactured and used by or for the Government of the United States of America for governmental purposes without the payment of any royalties thereon or therefor.

This invention relates in general to separable connecting devices, and more particularly to lightweight separable connector means for permitting the disconnection of the stages of a multistage missile or the like.

Sounding rockets have been necessary for meteorological purposes, scientific space exploration and military application for some time and provide required information to permit efficient and successful use of larger rockets and other forms of space vehicles. The form of sounding rockets has resolved into a very low cost individual rocket capable of penetrating the atmosphere to desired heights. Where greater heights are desired to be attained, this can be accomplished in several ways some of which are by reducing the size of the sounding rocket, i.e. enlarging its capacity for carrying propellant, or attaching a booster to the rocket or connecting several of the existing rockets in tandem or other related procedures. Since many scientific programs of extreme importance cannot justify a high cost missile or increasing the cost of the present missile in order to attain greater heights for its variation, the present invention provides a means for increasing the range of probe missiles at a very minimum increase in cost.

In my copending application, Serial No. 367,902, filed May 15, 1964, for Separable Connector for an Interstage Missile, there is shown and described a conector having similar utility to the connector of this invention but having certain restrictions which the present composite connector assembly avoids. The advantages of the present connector assembly over that disclosed in my copending application, above identified, are that an appreciable increase in altitude is attained through the use of a less costly and more easily manufactured composite connector assembly in lieu of the heavier connector described in the foregoing copending application. The increase in altitude is realized since altitude is directly related to the weight of the composite rocket, and, of course, if the overall weight can be reduced then the altitude attained by a booster and rocket or by a combination of rockets will be increased without requiring an increase in the propellant capacity of a single rocket or other factors. The present invention is also superior to prior devices in that a more accurate trajectory is attained through a more precise dispersal of gases of the second stage motor through the period when these gases are being exited through the connector assembly. It has been determined that the exhaust gas diverter of the connector assembly of the present invention disseminates exhaust gases in a much more uniform manner than prior devices and therefore there is appreciably less unbalanced diversion of the composite rocket from its trajectory.

As in the case of the connector of my copending application, above referred to, the interstage connector assembly of the present invention enables greater altitude to be attained by composite rocket motors with a significant reduction in damage to the sustainer or last stage rocket motor resulting from overstress due to the high acceleration forces appearing in the booster phase of a launching. Through the present invention, the high thrust of a first stage motor which in the past has caused overstressing and damage to the solid propellant grain of a second stage motor, is corrected by utilizing the internal pressure available in a second stage motor. Having the motors of both stages operating substantially simultaneously requires of course that the interstage connector assembly have means for dispersing the exhaust gases of the second stage which means must be capable of withstanding the heat of these gases as well as the corrosive action thereof. The use of the present connector assembly also permits the thrust of a first stage motor to maintain an efficient joining of both motors through the interstage connector assembly. Cessation of this thrust provides for the disconnection of the after rocket from the forward rocket and thereby eliminates any need for positive disconnecting devices.

Accordingly, it is an object of this invention to provide an adapter for connecting in tandem conventional booster and/or rockets so as to achieve greater altitude in the employment of surplus military rocket vehicles for meteorological probes and other missions.

It is another object of the present invention to provide a connecting means which is self aligning during operation of the after motor of a composite rocket, and which will accommodate at a minimum weight the forces and temperatures of exhaust of the gases of the forward motor thereof.

It is a still further object of the present invention to provide an interstage missile connector assembly through which exhaust gases of a forward rocket motor are evenly deflected so as to produce a minimum of error in the trajectory of a composite rocket motor.

It is a still further object of the present invention to provide an interstage missile connector assembly through which the ignition of a forward stage is effected upon a selected condition being achieved by an after stage.

Other objects and many of the attendant advantages of this invention will be readily appreciated as the same becomes better understood by reference to the following detailed description when considered in connection with the accompanying drawings in which like numerals represent like components throughout and wherein:

FIG. 1 is an elevation view, partly in section, of an assembled two-stage rocket vehicle employing the novel interstage connector assembly of this invention;

FIG. 2 is an enlarged elevation view, partly in section, of the assembled novel interstage connector assembly;

FIG. 3 is a top view of the insert used in the novel interstage connector assembly; and FIG. 4 is an elevation view of the insert shown in FIG. 3.

Referring to the drawing, there is shown in FIG. 1 an assembled multistage missile vehicle including an after or first booster stage 11 and a forward or second or sustainer stage 12, the stages 11 and 12 being assembled together by the novel interstage connector assembly 14, the latter including an adapter 15 and an insert 16. The forward stage 12 shown may be a meteorological probe one type being known as "ARCAS," or any other suitable probe missile. Such a probe includes a nose cone (not shown) which in a meteorological probe contains the instrument package, a parachute section (not shown) for recovering the system and a forward sustainer 20 having nozzle 21 and solid propellant 22.

First stage 11 includes a booster or first stage motor 24 of which several conventional types have been found satisfactory, namely, "SIDEWINDER," "ZUNI," and "HVAR." These booster motors are normally used in weapons systems, and are involved in substantially large production and also are subject to periodic improvement. The periodic improvements render previous probes surplus and of limited use. The invention connector assembly 14 enables these outmoded booster motors to be mated with a probe missile or the like and in effect creates the equivalent of a new booster motor.

Referring now to FIG. 2, the connector assembly of the present invention, in order to permit attaining maximum altitude from the propellants in the forward and after stage motors, is constructed in part of an outer support portion 25 which includes a base portion 27 and a sleeve portion 28, and the insert 16. The sleeve portion 28 is seated about an annular recess 29 in the base portion and secured therein by a plurality of conventional means such as screws 30. The screws allow for adjustment of the sleeve to accommodate the forward stage fins 31 when the missile bodies are mated. Base portion 27 is exteriorly threaded at 32 for screwing into the end of the casing of the after stage motor 24, forming a gas tight closure therefor. Base portion 27 is preferably constructed with a hollowed interior 34 for housing pressure actuated switches 35 which for simplicity and economy can be conventional automotive brake light pressure switches. The pressure actuated switches are normally in the "open" position until closed by the existence of a predetermined pressure in the combustion chamber of the first stage motor. Switches 35 are mounted in the end wall of the base portion and have hollow stem portions 36 which extend through the end wall 37 into the first stage motor 11. Bleed holes 38 are provided in the base portion to permit pressure from the first stage motor to actuate switches 35. Connectors 40 lead to the igniter (not shown) of a forward stage motor and are connected in parallel with the switches 35. Two pressure switches are included to protect against misfires due to failure of one of the switches. By this arrangement, the second stage motor 20 is not fired until the first stage motor 11 has been ignited and has developed a predetermined pressure signifying proper build up to desired thrust. The forward end of the base member 27 is preferably flat and is adapted to receive insert 16 which is shown in FIGS. 3 and 4. The after end of sleeve portion 28 contains a plurality of openings or ports 41 preferably inclined at an angle of 45° to the longitudinal centerline through the interstage connector assembly. Openings 41 provide an exit for the exhaust gases of the second or forward stage. Positioned within the area of the openings and covering a portion of the inner wall of the sleeve 28 in this porting area is the interstage insert 16. Insert 16 preferably is made of a material which is light in weight and yet heat resistant so as to protect the sleeve 28 which surrounds the outer periphery of the insert from the heat and corrosive action of the exhaust gases of the second stage. Insert 16 thus has an appreciable thickness about the opening in its upper periphery 42 which is exposed to exhaust gases of the second stage. Insert 16 has a deflector portion 43 in the lower or after part thereof which extends vertically along the longitudinal centerline of the insert 16 and the composite multistage assembly, the raised portion resulting from a coring of the insert at the aforementioned 45° angle as measured from the centerline of the missile-booster complex in a counterclockwise direction. Exhaust gases emanating from the second stage motor are diverted by the peaked portion 43 of the insert and since the peaked portion is symmetrical with respect to all openings the exhaust gases are diverted without appreciable differences in side thrust thereby not affecting the true course of the missile. A composite interstage including a sleeve, base and insert, with a sleeve and base made of a light weight metal such as aluminum and the insert made of an organic heat resilient material such as a thermosetting phenolic resin has been found capable of withstanding the heat and corrosive action of the exhaust of a second stage motors during the period when the motors are connected, as well as dissipating the exhaust gases evenly around the periphery to prevent unbalanced side thrust.

The forward end of sleeve 28 is formed with a plurality of openings 45 therein to accommodate the fins 31 of the second or forward stage. The openings are interspersed by metal extensions such as fingers 46 which are of sufficient length to provide necessary support for the forward stage or probe missile 12 and also to prevent relative spin about the longitudinal axis of the complex of this multistage missile. The number of fingers and openings will, of course, vary depending on the number of fins on the second stage missile to be accommodated. The inner diameter of sleeve portion 28 is dimensioned to receive the boat tail of missile 12 as shown in FIG. 1. The base of each finger 46 is tapered at 48 to conform to the taper of the end of the boat tail and also to provide a self-aligning feature when the missile is initially subjected to acceleration. Screws 30 enable sleeve 28 to be rotatably adjusted in position to permit proper alignment of fins 31 with a corresponding sleeve opening 45.

The probe missile 12 and first stage rocket 11 are maintained in juxtaposition through the high thrust of the after stage motor as compared with the low initial thrust of the probe missile motor only. That is, there is no physical restraint between the interstage connector assembly 14 and the probe missile 12. When the booster motor thrust drops below that of the sustaining motor, which occurs at approximately booster motor burn-out, the interstage connector assembly allows separation of the stages through the continued acceleration forces of the probe missile or forward stage motor. In the absence of booster force of the after motor, the probe missile will be driven out of the interstage assembly by the force of its exhaust gases and will then continue in flight without need for any positive rejection of the first stage motor or the interstage assembly. Pressure switches 35 prevent premature ignition of the probe missile motor until the after stage or booster motor has developed a sufficient thrust to keep the interstage connector assembly engaged with the probe missile motor. Although two pressure switches are shown connected in parallel, it is within the concept of the invention that the number of these switches may be varied, that is one or more, depending on the reliability desired. The presence of the pressure switches assures that the forward stage motor will not ignite until there has been a predetermined build up of thrust in the after stage motor, and in the event the after stage motor does not ignite upon receiving the firing pulse a forward stage motor cannot ignite thereby avoiding an aborted flight.

The novel interstage connector assembly of the present invention makes possible the use of over-age or phased-out booster motors that are surplus equipment and thereby provides an inexpensive source of first or booster stage motors for scientific probes or other high altitude activity. Through the use of lightweight connectors constructed of light materials such as aluminum and having a protective insert made of a substance such as phenolic a high degree of reliability is achieved. The use of phenolic or a similar material in insert 16 has resulted in a more symmetrical deterioration thereof due to the heat and erosion of exhaust gases than occurred in connectors made integrally of metal such as steel. The insert of the present invention thus provides for a more even dispersion of exhaust gases plus permitting a considerably lighter connection which results in greater range of the multistage missiles.

The acceleration forces during the initial phase of flight maintain the after or booster motor and the forward or probe missile motor interconnected and engaged by means of the interstage connector assembly. Automatic separation of the after stage and the interstage connector is effected when the after stage motor thrust falls below that of the forward stage motor thrust. The interstage connecter assembly is so configured on its outer surfaces as to not interfere with conventional launchers used for launching many high altitude probes.

It will be recognized that many modifications and variations of the present invention are possible in the light of the above teachings. It is therefore to be understood that within the scope of the appended claims the invention may be practiced otherwise than as specifically described.

I claim:

1. In a multistage missile having at least an after stage booster motor and a forward stage sustainer motor:
   a separable interstage connector assembly for coupling together said motors during at least a portion of the initial phase of flight;
   said connector assembly including an outer structural member of lightweight inorganic material;
   said connector assembly further including an inner protecting member of organic material;
   said outer and inner members when assembled having passages therethrough which provide for symmetrical dispersion of exhaust gases of said forward stage motor; and
   said connector assembly coupled to said after stage motor and said forward stage motor so as to present no physical restraint therebetween;
   whereby when the after stage motor thrust falls below that of the forward stage motor said interstage connector assembly will provide for separation of said after and forward stage motors through continued acceleration forces of said forward stage motor.

2. The device as defined in claim 1 wherein said outer structural member is composed of lightweight metallic material and said inner protecting member is composed of thermosetting resin material:
   whereby use of said lightweight outer member permits greater altitudes to be attained in conjunction with protection provided by said inner member against loss of structural integrity through heat and erosion.

3. The device as defined in claim 2 wherein said outer structural member includes a base portion for removable attachment to the after stage motor and a forward portion for releasably containing and supporting the forward stage motor.

4. The device as defined in claim 3 and further including pressure responsive switch means positioned within said base portion for effecting ignition of said forward stage motor upon a selected level of thrust being achieved by said after stage motor.

5. In a multistage missile having at least an after stage booster motor in a forward stage sustainer motor:
   a separable interstage connector assembly for connecting together said motors during the initial phase of flight;
   said connector assembly including an outer member made of lightweight material;
   said outer member having a base portion for removable attachment to the after stage motor and a forward portion for releasably containing and supporting the forward stage motor;
   said forward portion having symmetrically disposed supporting means for diverting the exhaust gases of said forward sustainer motor laterally about the periphery of the connector assembly; and
   said connector assembly including insert means disposed over the interior surfaces of said forward portion directly exposed to sustainer motor exhaust gases to maintain structural integrity of said assembly during the time of passage therethrough of exhaust gases from said sustainer motor;
   whereby the sustainer and the booster motor can operate simultaneously during the initial phase of flight and achieve altitudes not attainable with a unitary connector made of more heat resistant material.

6. A device as defined in claim 5 wherein said connector assembly includes finger portions extending forward along the exterior surface of said forward stage sustainer motor to encompass and hold in position the aft portion of the said second stage motor.

7. A device as defined in claim 6 wherein said connector fingers have tapered internal surfaces for engagement with complementary surfaces on the forward stage motor for alignment purposes.

References Cited by the Examiner
UNITED STATES PATENTS

| 1,102,653 | 7/1914 | Goddard | 102—49 |
| 2,995,319 | 8/1961 | Kershner et al. | 102—49 |

FOREIGN PATENTS

| 572,824 | 3/1959 | Canada. |

MARK NEWMAN, *Primary Examiner.*

C. R. CROYLE, *Assistant Examiner.*